US006751415B1

(12) United States Patent
Fabiny (10) Patent No.: US 6,751,415 B1
(45) Date of Patent: Jun. 15, 2004

(54) REDUCTION OF POLARIZATION-DEPENDENT LOSS FROM GRATING USED IN DOUBLE-PASS CONFIGURATION

(75) Inventor: Larry Fabiny, Boulder, CO (US)

(73) Assignee: PTS Corporation, San Jose, CA (US)

( * ) Notice: Subject to any disclaimer, the term of this patent is extended or adjusted under 35 U.S.C. 154(b) by 100 days.

(21) Appl. No.: 09/706,489

(22) Filed: Nov. 3, 2000

(51) Int. Cl.[7] .......................... H04B 10/20; H04J 14/02
(52) U.S. Cl. .......................... 398/50; 398/86; 398/87; 359/498
(58) Field of Search ........................ 359/117, 128, 359/129, 130, 131, 169, 170, 498; 385/37; 398/45, 48, 49, 55, 56, 57, 86, 87, 88

(56) References Cited

U.S. PATENT DOCUMENTS

| | | | | |
|---|---|---|---|---|
| 5,414,540 | A | | 5/1995 | Patel et al. ............... 359/39 |
| 5,724,165 | A | * | 3/1998 | Wu ........................ 359/117 |
| 5,862,287 | A | * | 1/1999 | Stock et al. .............. 359/161 |
| 5,912,748 | A | * | 6/1999 | Wu et al. .................. 359/117 |
| 5,917,625 | A | * | 6/1999 | Ogusu et al. .............. 359/124 |
| 5,960,133 | A | | 9/1999 | Tomlinson |
| 5,999,672 | A | | 12/1999 | Hunter et al. |
| 6,097,519 | A | | 8/2000 | Ford et al. |
| 6,097,859 | A | | 8/2000 | Solgaard et al. |
| 6,108,471 | A | | 8/2000 | Zhang et al. |
| 6,249,364 | B1 | * | 6/2001 | Martin et al. ............. 359/117 |
| 6,275,623 | B1 | * | 8/2001 | Brophy et al. ............. 359/115 |
| 6,307,657 | B1 | * | 10/2001 | Ford ....................... 359/130 |
| 6,381,387 | B1 | * | 4/2002 | Wendland, Jr. ............ 359/124 |
| 6,507,421 | B1 | * | 1/2003 | Bishop et al. .............. 398/56 |
| 6,529,307 | B1 | * | 3/2003 | Peng et al. ................ 359/256 |

OTHER PUBLICATIONS

U.S. patent application Ser. No. 09/442,061, filed Nov. 16, 1999.

Sun, et al., "Demultiplexer with 120 Channels and 0.29–nm Channel Spacing," IEEE Photonics Technology Letters, vol. 10, No. 1, Jan. 1998, pp. 90–92.

Nishi et al., "Broad–Passband–Width Optical Filter for Multi/Demultiplexer Using a Diffraction Grating and a Retroreflector Prism," Electronics Letters, vol. 21, No. 10, May 1985, pp. 423–424.

Philippe et al., "Wavelength demultiplexer: using echelette gratings on silicon substrate," Applied Optics, vol. 24, No. 7, Apr. 1985, pp. 1006–1011.

Piezo Systems, Inc. Catalog #2, 1998, pp. 1, 30–45.

Ford et al., "Wavelength Add–Drop Switching Using Tilting Micromirrors," Journal of Lightwave Technology, vol. 17, No. 5, May 1999, pp. 904–911.

Grade, John D., et al., "A Large–Deflection Electrostatic Actuator for Optical Switching Applications," Solid State Sensor and Actuator Workshop, Hilton Head Island, SC, Jun. 4–8, 2000.

Rallison, R.D., "Dense Wavelength Division Multiplexing (DWDM) and the Dickson Grating," White Paper, Jan. 6, 2001.

* cited by examiner

*Primary Examiner*—Leslie Pascal
*Assistant Examiner*—Dalzid Singh
(74) *Attorney, Agent, or Firm*—Townsend and Townsend and Crew LLP (57) ABSTRACT

A wavelength router is provided for receiving, at an input port, light having a plurality of spectral bands and directing some of those spectral bands to various output ports. The wavelength router includes an optical arrangement configured to provide optical paths for routing the spectral bands between the input and the output ports. A routing mechanism within the wavelength router has at least one dynamically configurable routing element to direct a given spectral band to different output ports, depending on the state of the dynamically configurable element. The wavelength router also includes a polarization-rotation element disposed with respect to the optical arrangement and the routing mechanism to be encountered by each optical path at least twice.

43 Claims, 5 Drawing Sheets

REDUCTION OF POLARIZATION-DEPENDENT LOSS FROM GRATING USED IN DOUBLE-PASS CONFIGURATION

BACKGROUND OF THE INVENTION

This application relates generally to optical communications networks, and more specifically to a method and apparatus for reducing the polarization dependent loss from diffraction gratings used in such communications networks.

The Internet and data communications are causing an explosion in the global demand for bandwidth. Fiber optic telecommunications systems are currently deploying a relatively new technology called dense wavelength division multiplexing (DWDM) to expand the capacity of new and existing optical fiber systems to help satisfy this demand. In DWDM, multiple wavelengths of light simultaneously transport information through a single optical fiber. Each wavelength operates as an individual channel carrying a stream of data. The carrying capacity of a fiber is multiplied by the number of DWDM channels used. Today, DWDM systems using up to 80 channels are available from multiple manufacturers, with more promised in the future.

Optical wavelength routing functions often use demultiplexing of a light stream into its many individual wavelengths, which are then optically directed along different paths. Subsequently, different wavelength signals may then be multiplexed into a common pathway. Within such routing devices, the optical signals are routed between the common and individual optical pathways by a combination of dispersion and focusing mechanisms. The focusing mechanism forms discrete images of the common pathway in each wavelength of the different optical signals and the dispersion mechanism relatively displaces the images along a focal line by amounts that vary with the signal wavelength.

Both phased arrays and reflective diffraction gratings may be used to perform the dispersing functions. While phased arrays are adequate when the number of channels carrying different wavelength signals is small, reflective diffraction gratings are generally preferable when large numbers of channels are used. However, reflective diffraction gratings tend to exhibit greater polarization sensitivity and since the polarization of optical signals often fluctuates in optical communication systems, this sensitivity may result in large variations in transmission efficiency. Loss of information is possible unless compensating amplification of the signals is used to maintain adequate signal-to-noise ratios. Although polarization sensitivity may generally be mitigated by increasing the grating pitch of the reflective grating, limitations on the desired wavelength dispersion for signals at optical telecommunication wavelengths preclude an increase in grating pitch sufficient to achieve high diffraction efficiency in all polarization directions.

Suggestions to reduce polarization dependent losses in optical switching systems have included complex polarization splitting and recombination techniques, such as described in WO 98/35251, published Aug. 13, 1998. In the method described therein, an optical beam is separated into distinct subbeams for different polarization states and optically constrained to follow different paths, which ultimately converge so that the subbeams may be recombined. Creating and maintaining separate optical paths requires additional components and increases both the cost and complexity of the devices that use the method. Furthermore, the recombination of the subbeams requires very precise alignment of the optical components to prevent the introduction of spurious distortion resulting from imperfect recombination.

It is thus desirable to provide a method and apparatus that reduces or eliminates polarization dependent loss from diffraction gratings used in optical telecommunications systems without requiring beams with different polarization states to follow different optical paths.

SUMMARY OF THE INVENTION

Embodiments of the invention are directed to a wavelength router for receiving, at an input port, light having a plurality of spectral bands and directing some of those spectral bands to various output ports. In one embodiment, the wavelength router includes an optical arrangement configured to provide optical paths for routing the spectral bands between the input and the output ports. A routing mechanism within the wavelength router has at least one dynamically configurable routing element to direct a given spectral band to different output ports, depending on the state of the dynamically configurable element. The wavelength router also includes a polarization-rotation element disposed with respect to the optical arrangement and the routing mechanism to be encountered by each optical path at least twice.

In certain embodiments, the polarization-rotation element is configured to rotate polarization states by approximately 45° with respect to fixed orthogonal axes. Thus, embodiments use a quarter-wave plate or Faraday rotator to achieve the polarization rotation. In some embodiments, the polarization-rotation element is configured so that it is encountered by each optical path before and after each optical path encounters the routing mechanism.

In one embodiment, the optical arrangement includes a dispersive element and is configured so that light on each optical path encounters the dispersive element twice. The dispersive element may be a reflective or transmissive grating, or may be a prism, in different embodiments. The optical arrangement may also include lens or reflective surfaces to define the optical paths by collimating and focusing light as it is directed to the routing mechanism and output ports.

BRIEF DESCRIPTION OF THE DRAWINGS

A further understanding of the nature and advantages of the present invention may be realized by reference to the remaining portions of the specification and the drawings wherein like reference labels are used throughout the several drawings to refer to similar components.

DESCRIPTION OF THE SPECIFIC EMBODIMENTS

1. Introduction

The following description sets forth embodiments of a method and apparatus that reduces or eliminates polarization dependent losses from a diffraction grating. Embodiments of the invention may be used generally in optical telecommunications systems or in other applications where reduction of polarization dependent losses is desirable. In particular embodiments, such polarization dependent losses are reduced or eliminated in a wavelength router to achieve the goals of optical networking systems.

The general functionality of one such optical wavelength router that can be used with embodiments of the invention is described in detail in the copending, commonly assigned U.S. Patent Application, filed Nov. 16, 1999 and assigned Ser. No. 09/442,061, entitled "Wavelength Router," which is herein incorporated by reference in its entirety, including the Appendix, for all purposes. As described therein, such an optical wavelength router accepts light having a plurality of spectral bands at an input port and selectively directs subsets of the spectral bands to desired ones of a plurality of output ports. Light entering the wavelength router from the input port forms a diverging beam, which includes the different spectral bands. The beam is collimated, such as by a lens or concave mirror, and directed to a diffraction grating that disperses the light so that collimated beams at different wavelengths are directed at different angles. The reduction in polarization dependent losses achieved by embodiments of the invention translates directly into improved efficiency in operation of the wavelength router.

2. Diffraction of Optical Signals

Demultiplexing of an optical signal that contains a plurality of signals at different wavelengths may be accomplished with a diffraction grating with appropriately sized and shaped diffraction grooves. An example of such a demultiplexing diffraction grating is illustrated in FIG. 1. When illuminated at an angle α from the normal, the grating 100 directs light with wavelength λ toward angle β in accordance with the formula $$m\lambda = d(\sin \alpha \pm \sin \alpha),$$

where m is an integral order of interference and d is the grating period. The manner in which incident light will be distributed among the various orders of interference depends on the shape and orientation of the groove sides and on the relation of wavelength to groove separation. When $d \leq \lambda$, diffraction effects predominate in controlling the intensity distribution among orders, but when $d > \lambda$, optical reflection from the sides of the grooves is more strongly involved. Diffraction gratings 100 are manufactured classically with the use of a ruling engine by burnishing grooves with a diamond stylus in a substrate 120 or holographically with the use of interference fringes generated at the intersection of two laser beams.

The efficiency of the diffraction grating depends on the polarization state of the incident light. The electric field E of an arbitrarily polarized incident optical signal may be written as a superposition of two electric fields linearly polarized along two orthogonal axes $\hat{x}$ and $\hat{y}$:

$$E = E_x \hat{x} + E_y \hat{y}.$$

The intensity $I_o$ of the incident signal is defined by the strength of the electric field along the orthogonal directions:

$$I_0 = \frac{1}{2}\sqrt{\frac{\varepsilon}{\mu}}(|E_x|^2 + |E_y|^2),$$

where $\varepsilon$ and $\mu$ respectively denote the permittivity and permeability of the medium. To make the remaining derivation more transparent, units are chosen in which $\varepsilon = 4\mu$ so that the coefficient relating the intensity and squared electric field is unity. The efficiency is governed by independent efficiency coefficients $\varepsilon$ in the orthogonal polarization directions such that the electric field E' of the signal reflected by the grating is $$E' = -\sqrt{\varepsilon_x} E_x \hat{x} - \sqrt{\varepsilon_y} E_y \hat{y},$$

with total intensity $$I' = \varepsilon_x |E_x|^2 + \varepsilon_y |E_y|^2.$$

It is thus evident that the intensity of a signal linearly polarized along one of the two orthogonal axes is reflected by the diffraction grating with an intensity dependent only on the efficiency coefficient for that direction:

$$I'_x = \varepsilon_x |E_x|^2$$

$$I'_y = \varepsilon_y |E_y|^2.$$

For most diffraction gratings, $\varepsilon_x \neq \varepsilon_y$, so there may be large variability in the overall efficiency as a function of the polarization state of the incident signal.

3. Polarization Rotation

In embodiments of the invention, this variability is reduced or eliminated by imposing a polarization rotation. Such a polarization rotation may be achieved by introducing a wave delay along one polarization component of the electric field. In one embodiment, this may be achieved by using a wave plate, which is constructed asymmetrically so that different indices of refraction are achieved in two orthogonal directions. Thus, when the incident optical signal passes through the wave plate, one component of the electric field is delayed relative to the other. Typically, wave plates are constructed to impose phase differences of π ("half-wave plate") or π/2 ("quarter-wave plate"), although as explained below the invention encompasses other phase differences in appropriate embodiments.

An alternative element that may be used to introduce the desired polarization rotation is a Faraday rotator, which exploits the Faraday effect. A linearly polarized wave may be regarded as the resultant of two circularly polarized waves of equal amplitude but opposite rotation senses. If the two circularly polarized waves have different phase constants, the plane of polarization of the resultant linearly polarized wave rotates as the wave propagates. A Faraday rotator makes use of this effect by imposing a magnetic field, such as with a high-strength rare-earth permanent magnet in conjunction with a single high-damage-threshold optical element to produce a uniform polarization rotation. The amount of polarization rotation is given by $$\theta = \int dz V(z) H_z,$$

where the integration is over the optical path length z, $H_z$ is the longitudinal component of the magnetic field, and V(z) is the Verdet constant of the optical element, which has been expressed generally as dependent on the optical path.

a. Reflective Diffraction Grating

Figure 1A:
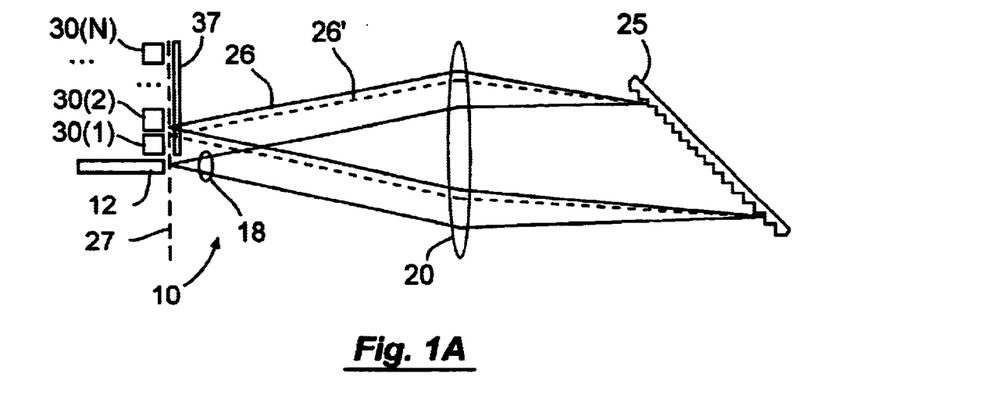
FIGS. 1A, 1B, and 1C are schematic top, side, and end views, respectively, of a wavelength router according to an embodiment of the invention that uses spherical focusing elements with a reflective diffraction grating.
Figure 1B:
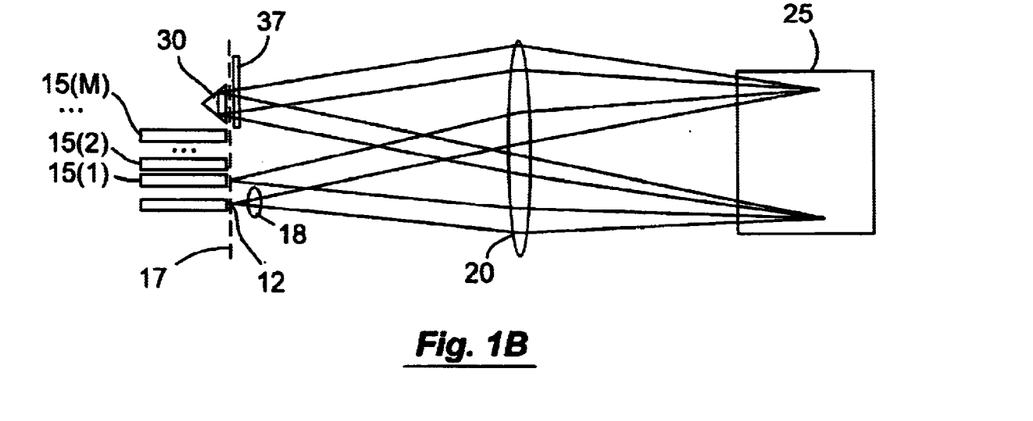
Figure 1C:
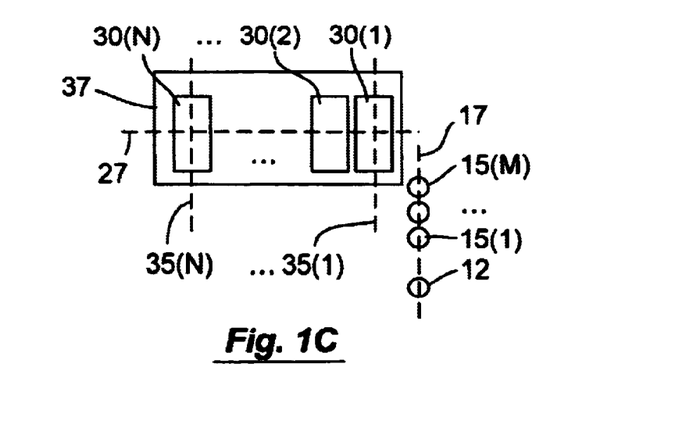

FIGS. 1A, 1B, and 1C are schematic top, side, and end views, respectively, of a wavelength router 10 according to an embodiment of the invention. The general functionality of wavelength router 10 is to accept light having a plurality of (say N) spectral bands at an input port 12, and selectively direct subsets of the spectral bands to desired ones of a plurality of (say M) output ports, designated 15(1 . . . M). The output ports are shown in the end view of FIG. 1C as disposed along a line 17 that extends generally perpendicular to the top view of FIG. 1A. The input and output ports are shown as communicating with respective input and output optical fibers, but it should be understood that the input port could also receive light directly from a light source, and the output ports could be coupled directly to optical detectors. The drawing is not to scale.

Light entering wavelength router 10 from input port 12 forms a diverging beam 18, which includes the different spectral bands. Beam 18 encounters a lens 20, which collimates the light and directs it to a reflective diffraction grating 25. Grating 25 disperses the light so that collimated beams at different wavelengths are directed at different angles back towards lens 20. Two such beams are shown explicitly and denoted 26 and 26' (the latter drawn in dashed lines). Since these collimated beams encounter the lens at different angles, they are focused at different points along a line 27 in a transverse focal plane. Line 27 extends in the plane of the top view of FIG. 1A.

The focused beams pass through polarization-rotation element 37 and subsequently encounter respective ones of a plurality of retroreflectors, designated 30(1 . . . N), located near the focal plane. The polarization-rotation element 37 may be, in different embodiments, a quarter-wave plate or 45° Faraday rotator, for example. The beams are directed, as diverging beams, back to lens 20 after passing again through polarization-rotation element 37. As will be described in detail below, each retroreflector sends its intercepted beam along a reverse path that may be displaced in a direction perpendicular to line 27. More specifically, the beams are displaced along respective lines 35(1 . . . N) that extend generally parallel to line 17 in the plane of the side view of FIG. 1B and the end view of FIG. 1C.

In the particular embodiment shown, the displacement of each beam is effected by moving the position of the retroreflector along its respective line 35(i). In other embodiments, to be described below, the beam displacement is effected by a reconfiguration of the retroreflector. It is noted that the retroreflectors are shown above the output ports in the plane of FIG. 1C, but this is not necessary; other relative positions may occur for different orientations of the grating or other elements.

The beams returning from the retroreflectors are collimated by lens 20 and directed once more to grating 25. Grating 25, on the second encounter, removes the angular separation between the different beams, and directs the collimated beams back to lens 20, which focuses the beams. However, due to the possible displacement of each beam by its respective retroreflector, the beams will be focused at possibly different points along line 17. Thus, depending on the positions of the retroreflectors, each beam is directed to one or another of output ports 15(1 . . . M).

This embodiment is an airspace implementation of a more generic class of what are referred to as free-space embodiments. In some of the other free space embodiments, to be described below, the various beams are all within a body of glass. The term "free-space" refers to the fact that the light within the body is not confined in the dimensions transverse to propagation, but rather can be regarded as diffracting in these transverse dimensions. Since the second encounter with the dispersive element effectively undoes the dispersion induced by the first encounter, each spectral band exits the router with substantially no dispersion.

In the embodiment illustrated with FIGS. 1A, 1B, and 1C, the effect of the polarization-rotation element is to eliminate polarization-dependent loss in the wavelength router 10. The specific effect of the polarization-rotation element may be understood by comparing the electric field that results without it (as in FIGS. 1A, 1B, and 1C of Appl. Ser. No. 09/442,061) and with it (as in the current FIGS. 1A, 1B, and 1C). The configuration of the wavelength router 10 may be summarized in terms of the optical elements encountered by each path as it proceeds through the wavelength router 10.

In the embodiment described above, the light traverses the region between the ports and the grating four times, twice in each direction. The optical route followed, without the polarization-rotation element, may be summarized as follows: (1) a light beam enters the router from an input port 12; (2) the light beam is collimated through a lens 20 ("L"); (3) the light beam is dispersed by a reflective diffraction grating 25 ("$G_r$") into multiple collimated subbeams of different wavelengths; (4) each collimated subbeam propagates back through lens 20 ("L"); (5) each collimated subbeam is focused by lens 20 and reflected by a retroreflector 30 ("R") into a diverging subbeam; (6) each diverging subbeam is collimated through lens 20 ("L"); (7) each subbeam is directed back to the reflective diffraction grating 25 ("$G_r$") to remove the angular separation between the different subbeams; and (8) the collimated subbeams are directed through lens 20 ("L") yet again so that they are focused. Each of the diffractions and reflections has an effect on the electric field E; without loss of generality the effect of the lens can be ignored in determining the extent of polarization-dependent losses. In the discussion below, the retroreflector R is treating as consisting of two reflective surfaces, such as a row mirror and a MEMS array, but the analysis is not dependent upon such a configuration and may apply to other retroreflector configurations.

Using the result provided above for the effect of a reflection from the diffraction grating, the electric field after two reflections from the reflective diffraction grating 25 is seen to be $$E_{fin}^0 = \epsilon_x E_x \hat{x} + \epsilon_y E_y \hat{y},$$

and has total intensity $$I_{fin}^0 = \epsilon_x^2 |E_x|^2 + \epsilon_y^2 |E_y|^2.$$

The large variability in overall system efficiency is eliminated by including the polarization rotation element, such as a quarter-wave plate or 45° Faraday rotator, between the retroreflectors and the lens L. In other embodiments, the polarization-rotation element is positioned between the lens and the diffraction grating. With such positioning, each subbeam passes through the polarization-rotation element twice, before it is retroreflected (i.e., immediately before step (5)) and after it is retroreflected (i.e., immediately after step (5)). Just before its first pass through the polarization-rotation element (i.e. after one reflection from the diffraction grating), the electric field is $$E' = -\sqrt{\epsilon_x} E_x \hat{x} - \sqrt{\epsilon_y} E_y \hat{y}.$$

After passing through the polarization-rotation element, reflecting off two surfaces in the retroreflector, and passing through the polarization-rotation element a second time, the electric field is $$E''=\sqrt{\epsilon_y}E_y\hat{x}-\sqrt{\epsilon_x}E_x\hat{y}.$$

This result follows for a quarter-wave plate having orthogonal axes oriented at 45° with respect to the electric-field axes $\hat{x}$ and $\hat{y}$ or for a Faraday rotator configured to introduce a uniform 45° polarization rotation. Two passes through the polarization-rotation element rotate the x component of the electric field to y polarization and rotate they component to x polarization. Thus, after reflecting off the reflective grating $G_r$ a second time, the electric field is $$E_{fin}=-\sqrt{\epsilon_x}\sqrt{\epsilon_y}E_y\hat{x}+\sqrt{\epsilon_x}\sqrt{\epsilon_y}E_x\hat{y},$$

having total intensity $$I_{fin}=\epsilon_x\epsilon_y|E_x|^2+\epsilon_x\epsilon_y|E_y|^2\equiv\epsilon_x\epsilon_yI_o.$$

Thus, the electric field and its intensity are independent of the state of polarization of the incident wave, thereby eliminating polarization-dependent loss.

The calculation may profitably be formalized by defining operators L, $G_r$, Q, and R respectively to correspond to the effect on the electric field of lens L, reflective grating $G_r$, 45° polarization-rotation element Q, and retroreflector R. As mentioned above, the effect of lens L on the electric field may be ignored without loss of generality so that in a matrix representation over orthogonal coordinates $\hat{x}$ and $\hat{y}$, $$\mathcal{L}=\mathcal{I}\equiv\begin{pmatrix}1 & 0\\ 0 & 1\end{pmatrix}.$$

The retroreflector operator has a representation independent of the specific configuration used, $$\mathcal{R}=-\mathcal{I}\equiv\begin{pmatrix}-1 & 0\\ 0 & -1\end{pmatrix}.$$

The matrix representation of reflective grating operator is evident from the above discussion, $$\mathcal{G}_r=-\begin{pmatrix}\sqrt{\epsilon_x} & 0\\ 0 & \sqrt{\epsilon_y}\end{pmatrix}.$$

Finally, the matrix representation of the polarization-rotation element depends on whether an element such as a Faraday rotator or such as a quarter-wave plate is used. For a Faraday rotator, by introducing a rotation of the electric field of $\pi/2$, the matrix representation is $$Q_{FR}=\Omega_{\pi/2}=\frac{1}{\sqrt{2}}\begin{pmatrix}1 & -1\\ 1 & 1\end{pmatrix}.$$

It is useful to note that $$Q_{FR}^2=\Omega_\pi=\begin{pmatrix}0 & -1\\ 1 & 0\end{pmatrix},$$

which merely expresses the fact that two quarter-wave rotations correspond to a half-wave rotation. Unlike a Faraday rotator, a quarter-wave plate has fast and slow axes, and a preferred orientation. The matrix representation for a quarter-wave plate with axes at $\pi/4$ with respect to $\hat{x}$ and $\hat{y}$ is:

$$Q_{QWP}=\frac{1}{4}\begin{pmatrix}1+i & 1-i\\ 1-i & 1+i\end{pmatrix},$$

with $$Q_{QWP}^2=\begin{pmatrix}0 & 1\\ 1 & 0\end{pmatrix}.$$

The expressions derived above for how the electric field is affected by the various optical components in the configuration can be expressed simply using this optical operator formalism by stringing together the operators for the optical elements used:

$$E_{fin}^0=LG_rLRLG_rLE=-G_r^2E$$

$$E_{fin}=LG_rLQRQLG_rLE=-G_r Q^2 G_r E.$$

The results are expressed using a generic operator Q for the polarization-rotation element since the results are applicable for both a Faraday rotator and for a quarter-wave plate. The result shows that placement of either type of polarization-rotation element between the lens and retroreflectors introduces the rotation of polarization states that eliminates the polarization dependence of the electric field.

Figure 2A:
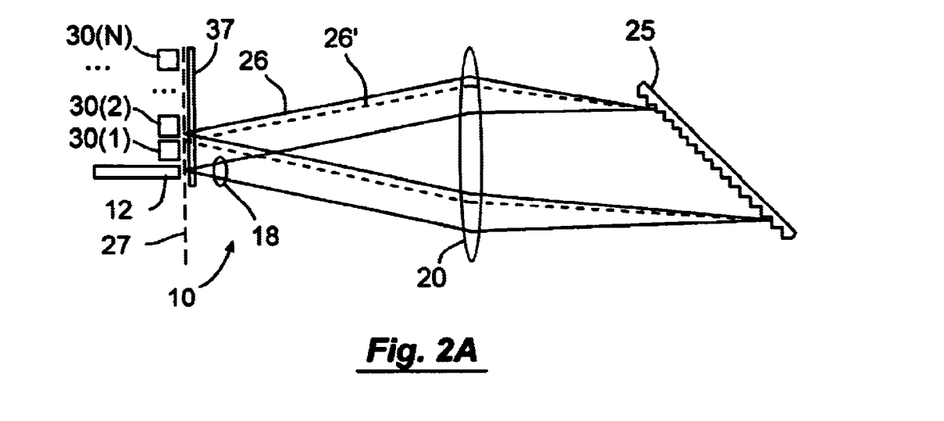
FIGS. 2A, 2B, and 2C are schematic top, side, and end views, respectively, of a wavelength router according to another embodiment of the invention that uses spherical focusing elements with a reflective diffraction grating.
Figure 2B:
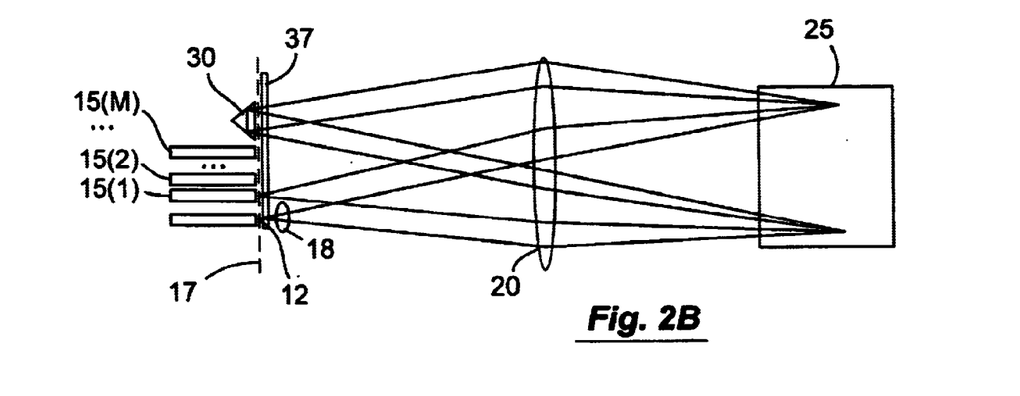
Figure 2C:
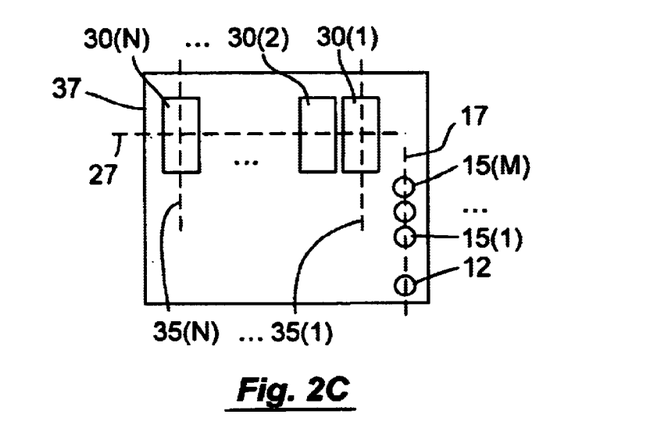

Another embodiment that uses a reflective diffraction grating is shown in schematic top, side, and end views, respectively in FIGS. 2A, 2B, and 2C. In this embodiment, the polarization-rotation element 37 is positioned so that its effect is not restricted to acting on beams 26 and 26' before and after encountering the retroreflectors 30. Instead, the polarization-rotation element 37 is positioned so that a beam 18 formed by input port 12 and any beam focussed back to output ports 15 also passes through the polarization-rotation element 37. Such a configuration also rotates polarization states to eliminate the polarization dependence of the electric field, and may be simpler to manufacture.

In particular, the polarization dependence may be determined by stringing together the optical operators so that an additional polarization-rotation element Q is included before and after the operator string used to define the configuration of FIGS. 1A–1C:

$$E_{fin}=QLG_rLQRQLG_rLQE=-QG_rQ^2G_rQE=-\sqrt{\epsilon_x\epsilon_y}E.$$

The result shows that including the polarization-rotation element 37 in this way still introduces rotations of polarization states that remove the polarization dependence of the electric field. Other configurations that use a polarization-rotation element to remove polarization dependencies from optical configurations such as described above may occur to those of skill in the art after reading the above disclosure. For example, a configuration in which a quarter-wave plate was positioned before retroreflectors 30 and a 45° Faraday rotator was positioned by the input and output ports 12 and 15 (or vice versa) would also remove the polarization dependence.

b. Transmissive Diffraction Grating

Figure 3A:
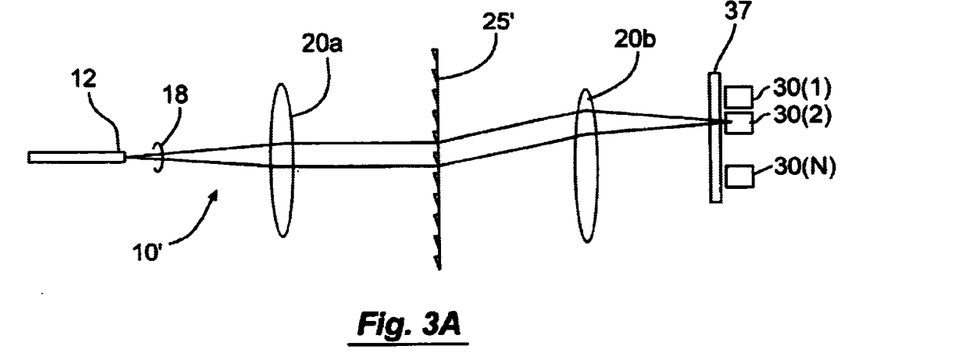
FIGS. 3A and 3B are schematic top and side views, respectively, of a wavelength router according to another embodiment of the invention that uses spherical focusing elements with a transmissive diffraction grating.
Figure 3B:
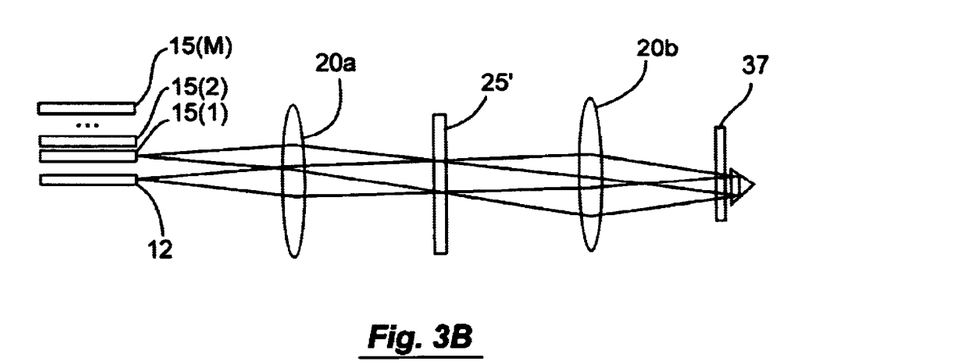

This optical operator formalism can be used to show that a similar optical configuration that uses a transmissive diffraction grating may also be configured to eliminate polarization dependence by including a polarization-rotation element such as a wave plate or Faraday rotator. One embodiment for a wavelength router, designated 10', that includes a transmissive diffraction grating is shown in FIGS. 3A and 3B, which are respectively schematic top and side views. The same reference numerals or primed or suffixed reference numerals are used for elements corresponding to those in FIGS. 1A–1C. This embodiment differs from the embodiment of FIGS. 1A–1C not only in that it uses a transmissive diffraction grating 25', but also in that it uses a pair of lenses 20a and 20b. Thus, this embodiment can be considered an unfolded version of the embodiment of FIGS. 1A–1C.

Light entering wavelength router 10' from input port 12 forms diverging beam 18, which includes the different spectral bands. Beam 18 encounters first lens 20a, which collimates the light and directs it to grating 25'. Grating 25' disperses the light so that collimated beams at different wavelengths emerge from the beam and proceed. The collimated beams, one of which is shown, encounter second lens 20b, which focuses the beams. The focused beams pass through the polarization-rotation element 37 and then encounter respective ones of plurality of retroreflectors 30(1 . . . N), located near the focal plane. The polarization-rotation element 37 may, for example, be a wave plate or Faraday rotator in different embodiments. The beams are reflected, and emerge as diverging beams that again pass through the polarization-rotation element 37, back to lens 20b, are collimated and directed to grating 25'. Grating 25', on the second encounter, removes the angular separation between the different beams, which are then focused in the plane of output ports 15(1 . . . M).

In the specific implementation, input port 12, lens 20a, grating 25', lens 20b, and the retroreflectors are spaced at approximately equal intervals, with the two lenses having equal focal lengths and the distance between the input port and the retroreflectors being four times (4×) the focal length. Thus the focal lengths and the relative positions define what is referred to as a "4f relay" between input port 12 and the retroreflectors, and also a 4f relay between the retroreflectors and the output ports. This configuration is not necessary, but is preferred. The optical system is preferably telecentric.

Thus, without the polarization-rotation element, incoming light takes the following route: (1) a light beam enters the router from an input port 12; (2) the light beam is collimated by the first lens 20a ("$L_1$"); (3) the collimated light beam is dispersed be the transmissive diffraction grating 25' ("$G_t$") into collimated subbeams at different wavelengths; (4) the collimated subbeams are focussed by the second lens 20b ("$L_2$"); (5) the subbeams are then reflected by retroreflectors 30 ("R") and emerge as diverging subbeams; (6) the diverging subbeams are collimated by the second lens 20b ("$L_2$"); (7) the collimated subbeams pass through the transmissive diffraction grating 25' ("$G_t$") a second time, thereby removing the angular separation; and (8) the resulting beam is focussed by the first lens 20a ("$L_1$") into the plane of the output ports. Using the optical operator formalism and noting that $G_t=-G_r$, the effect of including an appropriate polarization-rotation element Q between the second lens $L_2$ and the retroreflector R can be readily seen:

$$E_{fin}^0 = LG_tLRLG_tLE = -G_t^2E$$

$$E_{fin} = LG_tLQRQLG_tLE = -G_tQ^2G_tE.$$

The result is the same for the transmissive grating as for the reflective grating, illustrating that the use of a polarization-rotation element, such as a quarter-wave plate or 45° Faraday rotator, also eliminates polarization-dependent loss in embodiments that use a transmissive diffraction grating.

Figure 4A:
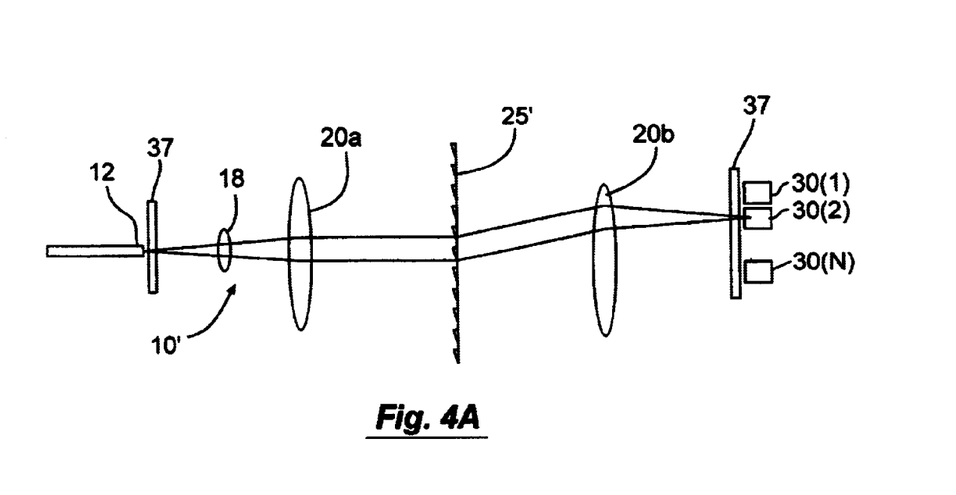
FIGS. 4A and 4B are schematic top and side views, respectively, of a wavelength router according to a further embodiment of the invention that uses spherical focusing elements with a transmissive diffraction grating.
Figure 4B:
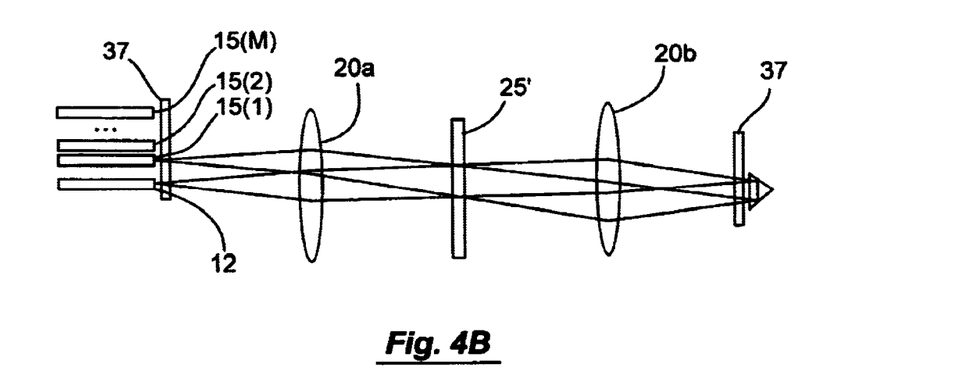

An alternative embodiment that uses a transmissive diffraction grating 25' is shown in schematic top and side views in FIGS. 4A and 4B. In this embodiment, two 45° polarization-rotation elements 37 are used, one positioned proximate the retroreflectors 30 as shown in FIGS. 3A and 3B, and the other positioned near the input port 12 and output ports 15. The effect of the addition polarization-rotation element 37 is to introduce a further rotation of polarization states in the beam 18 formed by input port 12 and in any beam focussed back to output ports 15.

The effect on the polarization dependence may be illustrated by adding the additional optical operators as above:

$$E_{fin} = QLG_tLQRQLG_tLQE = -QG_tQ^2G_tQE = -\sqrt{\epsilon_x\epsilon_y}E.$$

The result shows that including the additional polarization-rotation element 37 in this way still introduces rotations of polarization states that remove the polarization dependence of the electric field. Other configurations that use a polarization-rotation element in combination with a transmissive diffraction grating to remove polarization dependencies from optical configurations such as described above are also within the scope of the invention.

c. Solid Glass Embodiment

Figure 5:
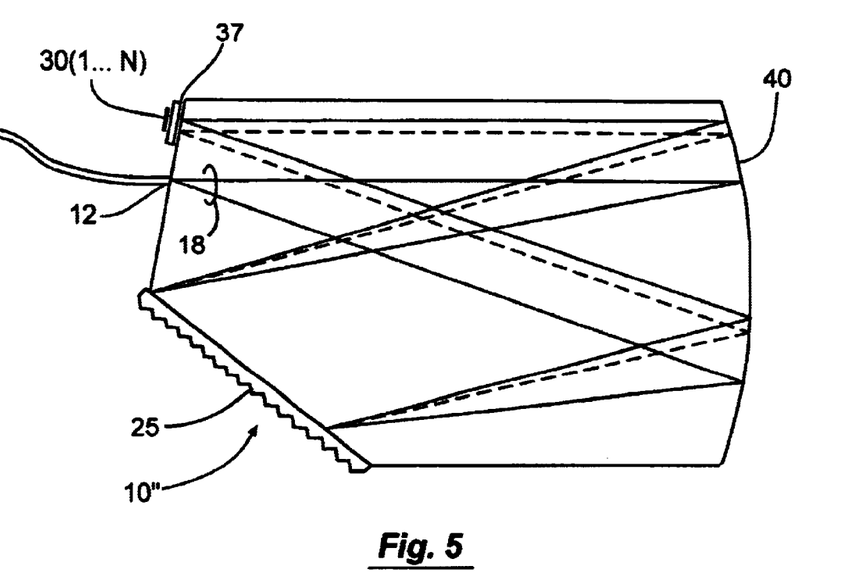
FIG. 5 is a schematic top view of a wavelength router according to a solid-glass embodiment of the invention that uses spherical focusing elements.

In still another embodiment, illustrated in FIG. 5, a solid glass configuration is used to route optical signals, the wavelength router in this embodiment being denoted 10". This embodiment can be considered to be a further folded version of the embodiment illustrated in FIGS. 1A–1C, using a concave reflector 40 instead of a lens 20 (or instead of lenses 20a and 20b in the embodiment shown in FIGS. 3A–3C) to direct light. As above, light entering wavelength router 10" from input port 12 forms diverging beam 18, which includes the different spectral bands. Beam 18 encounters concave reflector 40, which collimates the light and directs it to reflective diffraction grating 25. Grating 25 disperses the light so that collimated beams at different wavelengths are directed at different angles back toward reflector 40. Two such beams are shown explicitly, one in solid lines and one in dashed lines. Since these collimated beams encounter the reflector at different angles, they are focused at different points in a transverse focal plane.

The focused beams pass through a polarization-rotation element 30, which may be a wave plate or Faraday rotator, and encounter retroreflectors 30(1 . . . N) located near the focal plane. The operation in the reverse direction is as described in connection with the embodiments above, and the beams follow the reverse path, which is displaced in a direction perpendicular to the plane of FIG. 3. Therefore, the return paths directly underlie the forward paths and are therefore not visible in FIG. 3. On this return path, the beams encounter concave reflector 40, reflective grating 25', and concave reflector 40, the final encounter with which focuses the beams to the desired output ports (not shown in this figure) since they underlie input port 12.

As before, it is useful to specify the optical elements encountered in the path taken through the wavelength router 10": (1) light enters the router 10" from an input port 12, forming a divergent beam; (2) the beam encounters the concave reflector 40 ("R̂"), which collimates the beam; (3) the collimated beam is then dispersed by the reflective diffraction grating 25 ("$G_r$") into collimated subbeams at different wavelengths; (4) the collimated subbeams are directed back to the concave reflector 40 ("R̂") where they are focussed; (5) the focussed subbeams then encounter the retroreflectors 30 ("R") and are directed as dispersive subbeams back to the concave reflector 40 ("R̃") a third time; (6) the concave reflector 40 ("R̃") collimates the subbeams; (7) the collimated subbeams are directed back to the reflective diffraction grating 25 ("G_r"), which removes the angular separation between the subbeams; and (8) the beam is focussed in the plane of the output ports 15 by a fourth encounter with the concave reflector 25 ("R̃"). Using the optical operator formalism and setting R̃=−I without loss of generality, the effect on the electric field of the beam as a result of following such an optical path can be determined both without and with a polarization-rotation element 37 (45° Faraday rotator or quarter-wave plate) included between the concave reflector R̃ and the retroreflectors R:

$$E_{fin}^0 = \tilde{R}G_r\tilde{R}R\tilde{R}G_r\tilde{R}E = -G_r^2 E$$

$$E_{fin} = \tilde{R}G_r\tilde{R}QRQ\tilde{R}G_r\tilde{R}E = -G_rQ^2G_rE = -G_r\Omega_\pi G_rE.$$

Thus, the use of a quarter-wave plate or 45° Faraday rotator also eliminates polarization-dependent loss when used with a solid glass embodiment.

Figure 6:
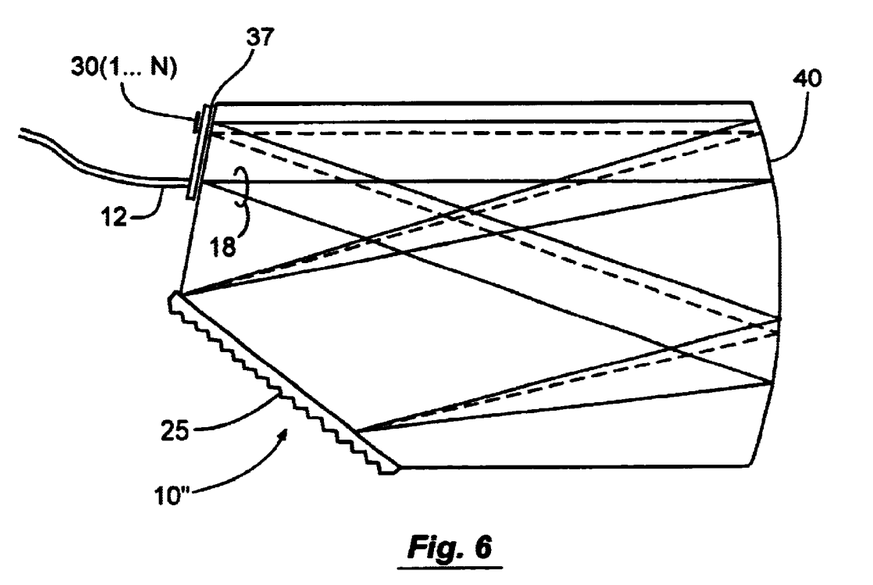
FIG. 6 is a schematic top view of a wavelength router according to another solid-glass embodiment of the invention that uses spherical focusing elements.

An alternative embodiment is shown in FIG. 6, in which the polarization-rotation element 37 is positioned so that it is encountered by beams to and from the input port 12 and output ports 15 in addition to beams to and from the retroreflectors 30. In such an instance the polarization dependence may be determined from $$E_{fin} = Q\tilde{R}G_r\tilde{R}QRQ\tilde{R}G_r\tilde{R}QE = -QG_rQ^2G_rQE = -\sqrt{\epsilon_x\epsilon_y}E,$$

illustrating again that the effect of the polarization-rotation elements is to remove the polarization dependence from the electric field.

4. Other Embodiments

In each of the embodiments described above, the diffraction grating is used in a double-pass configuration and light follows an optical path that includes reflections off various surfaces. In certain embodiments, the retroreflector performs two reflections off surfaces inclined at 90° with respect to each other. The invention is not so limited, however, and can include a different number of reflections as may be appropriate for particular applications. As evident from the formalism described above, additional reflections may introduce a sign change in the electric field, but the property that the field received by the output port be independent of polarization is invariant under such sign changes. It is also possible that imperfect reflection of the optical signal at certain surfaces may introduce spurious polarization of the field. In such cases, the invention still reduces polarization-dependent losses even if they are not eliminated completely.

The invention may also be used in embodiments that include a different number of encounters with a diffraction grating. For example, where there are four encounters with the diffraction grating, the final electric field and intensity of the signal exhibit polarization dependence:

$$E_{fin}^0 = -G_r^4 E = -\epsilon_x^2 E_x\hat{x} - \epsilon_y^2 E_y\hat{y}$$

$$i\, I_{fin}^0 = \epsilon_x^4|E_x|^2 + \epsilon_y^4|E_y|^2.$$

By introducing a single quarter-wave plate into the four-pass optics, the polarization dependence of the electric filed and signal intensity vanishes:

$$E_{fin} = -\epsilon_x\epsilon_y E_y\hat{x} + \epsilon_x\epsilon_y E_x\hat{y}$$

$$I_{fin} = \epsilon_x^2\epsilon_y^2(|E_x|^2 + |E_y|^2).$$

Similar results follow for four-pass transmissive gratings and for optical configurations that use either lenses or mirrors to perform focussing or collimation as appropriate for applications.

Having described several alternative embodiments, it will be recognized by those of skill in the art that various other modifications, alternative constructions, and equivalents may be used without departing from the spirit of the invention. Accordingly, the above description should not be taken as limiting the scope of the invention, which is defined in the following claims.

What is claimed is:

1. A wavelength router for receiving, at an input port, light having a plurality of spectral bands and directing subsets of the spectral bands to respective ones of a plurality of output ports, the wavelength router comprising:

an optical arrangement configured to provide optical paths for routing the spectral bands between the input port and the output ports;

a routing mechanism having at least one dynamically configurable routing element to direct a given spectral band to different output ports, depending on a state of the dynamically configurable element; and a polarization-rotation element disposed with respect to the optical arrangement and the routing mechanism to be encountered by each optical path twice.

2. The wavelength router according to claim 1 wherein the polarization-rotation element is approximately a 45° polarization-rotation element.

3. The wavelength router according to claim 2 wherein the polarization-rotation element is a Faraday rotator.

4. The wavelength router according to claim 1 wherein the polarization-rotation element is a quarter-wave plate.

5. The wavelength router according to claim 1 wherein the polarization-rotation element is configured to be encountered by each optical path before and after each such optical path encounters the routing mechanism.

6. The wavelength router according to claim 5 wherein the polarization-rotation element is disposed between the optical arrangement and the routing mechanism.

7. The wavelength router according to claim 6 wherein the polarization-rotation element is further disposed between the input port and the optical arrangement and between the optical arrangement and the output ports.

8. The wavelength router according to claim 1 wherein the optical arrangement comprises a dispersive element disposed to intercept light traveling from the input port.

9. The wavelength router according to claim 8 wherein the dispersive element is a reflective grating.

10. The wavelength router according to claim 8 wherein the dispersive element is a transmissive grating.

11. The wavelength router according to claim 8 wherein the dispersive element is a prism.

12. The wavelength router according to claim 1 wherein the input port is located at the end of an input fiber.

13. The wavelength router according to claim 1 wherein the output ports are located at respective ends of a plurality of output fibers.

14. The wavelength router according to claim 1 wherein the routing mechanism includes a plurality of reflecting elements, each associated with a respective one of the spectral bands.

15. The wavelength router according to claim 1,
wherein the optical arrangement includes:
a lens; and
a reflective grating;
wherein the routing mechanism includes a plurality of dynamically configurable elements;

wherein light coming from the input port is collimated by the lens and is reflected from the reflective grating as a plurality of angularly separated beams corresponding to the spectral bands;

wherein the angularly separated beams are focused by the lens to encounter the polarization-rotation element and onto respective ones of the dynamically configurable elements; and wherein each dynamically configurable element has a plurality of states, each adapted to direct that dynamically configurable element's respective angularly separated beam along a desired one of a plurality of paths such that light leaving that dynamically configurable element again encounters the polarization-rotation element and is again collimated by the lens, reflected by the reflective grating, and again focused by the lens on one of the output ports corresponding to the desired one of the plurality of paths.

16. The wavelength router according to claim 15 wherein the polarization-rotation element is approximately a 45° polarization-rotation element.

17. The wavelength router according to claim 16 wherein the polarization-rotation element is a Faraday rotator.

18. The wavelength router according to claim 15 wherein the polarization-rotation element is a quarter-wave plate.

19. The wavelength router according to claim 1,
wherein the optical arrangement includes:
a first lens and a second lens; and
a transmissive grating disposed between the first lens and the second lens;
wherein the routing mechanism includes a plurality of dynamically configurable elements;
wherein light coming from the input port is collimated by the first lens and is transmitted though the transmissive grating as a plurality of angularly separated beams corresponding to the spectral bands;
wherein the angularly separated beams are focused by the second lens to encounter the polarization-rotation element and onto respective ones of the dynamically configurable elements; and
wherein each dynamically configurable element has a plurality of states, each adapted to direct that dynamically configurable element's respective angularly separated beam along a desired one of a plurality of paths such that light leaving that dynamically configurable element again encounters the polarization-rotation element and is collimated by the second lens, transmitted through the transmissive grating, and focused by the first lens on one of the output ports corresponding to the desired one of the plurality of paths.

20. The wavelength router according to claim 19 wherein the polarization-rotation element is approximately a 45° polarization-rotation element.

21. The wavelength router according to claim 20 wherein the polarization-rotation element is a Faraday rotator.

22. The wavelength router according to claim 19 wherein the polarization-rotation element is a quarter-wave plate.

23. The wavelength router according to claim 19 further comprising a second polarization-rotation element disposed with respect to the optical arrangement such that light coming from the input port encounters the second polarization-rotation element before being collimated by the first lens and encounters the second polarization-rotation element after being focused by the first lens on one of the output ports before encountering such one of the output ports.

24. The wavelength router according to claim 1,
wherein the optical arrangement includes:
a curved mirror; and
a reflective grating;
wherein the routing mechanism includes a plurality of dynamically configurable elements;
wherein light coming from the input port is collimated by the curved mirror and is reflected from the reflection grating as a plurality of angularly separated beams corresponding to the spectral bands;
wherein the angularly separated beams are focused by the curved mirror to encounter the polarization-rotation element and onto respective ones of the dynamically configurable elements; and
wherein each dynamically configurable element has a plurality of states, each adapted to direct that dynamically configurable element's respective angularly separated beam along a desired one of a plurality of paths such that light leaving that dynamically configurable element again encounters the polarization-rotation element and is again collimated by the curved mirror, reflected by the reflective grating, and again focused by the curved mirror on one of the output ports corresponding to the desired one of the plurality of paths.

25. The wavelength router according to claim 24 wherein light coming from the input port further encounters the polarization-rotation element before being collimated by the curved mirror and encounters the polarization-rotation element after being focused by the curved mirror on one of the output ports before encountering such one of the output ports.

26. The wavelength router according to claim 24 wherein the polarization-rotation element is approximately a 45° polarization-rotation element.

27. The wavelength router according to claim 26 wherein the polarization-rotation element is a Faraday rotator.

28. The wavelength router according to claim 24 wherein the polarization-rotation element is a quarter-wave plate.

29. The wavelength router recited in claim 1 wherein the optical arrangement and routing mechanism are relatively disposed such that each optical path is routed through the optical arrangement more than twice.

30. A method for directing a light beam having a plurality of spectral bands received at an input port, the method comprising:
collimating the light beam;
dispersing the collimated light beam into a plurality of angularly separated beams corresponding to the spectral bands;
focusing the angularly separated beams;
rotating polarization components of the focused angularly separated beams; and
routing the angularly separated beams to respective ones of a plurality of output ports.

31. The method according to claim 30 wherein routing the angularly separated beams to respective ones of the plurality of output ports comprises retroreflecting the angularly separated beams.

32. The method according to claim 31 wherein routing the angularly separated beams to respective ones of the plurality of output ports further comprises again rotating polarization components of the angularly separated beams.

33. The method according to claim 32 wherein routing the angularly separated beams to respective ones of the plurality of output ports further comprises:

collimating the angularly separated beams;

removing angular separation between the angularly separated beams; and focusing the collimated beams on the respective ones of the output ports.

34. The method according to claim 30 wherein rotating polarization components of the angularly separated beams comprises rotating the polarization components by approximately 45° with respect to fixed orthogonal axes.

35. The method according to claim 30 wherein rotating polarization components of the angularly separated beams comprises delaying propagation of a component of the angularly separated beams relative to an orthogonal component of the angularly separated beams.

36. The method according to claim 30 wherein rotating polarization components of the angularly separated beams comprises imposing a magnetic field on the angularly separated beams.

37. The method according to claim 30 further comprising rotating polarization components of the light beam prior to collimating the light beam.

38. The method according to claim 37 wherein routing the angularly separated beams to respective ones of a plurality of output ports comprises:

retroreflecting the angularly separated beams;

rotating polarization components of the retroreflected beams;

collimating the retroreflected beams;

removing angular separation between the collimated beams;

rotating polarization components of the collimated beams; and focusing the collimated beams on the respective ones of the output ports.

39. A wavelength router for receiving, at an input port, light having a plurality of spectral bands and directing subsets of the spectral bands to respective ones of a plurality of output ports, the wavelength router comprising:

an optical arrangement configured to provide optical paths for routing the spectral bands between the input port and the output ports;

a routing mechanism having at least one dynamically configurable routing element to direct a given spectral band to different output ports, depending on a state of the dynamically configurable element; and a polarization-rotation element disposed between the optical arrangement and the routing mechanism.

40. The wavelength router recited in claim 39 wherein the polarization-rotation element is a Faraday rotator.

41. The wavelength router recited in claim 39 wherein the polarization-rotation element is a quarter-wave plate.

42. The wavelength router recited in claim 39 wherein the polarization-rotation element is disposed to be encountered by each optical path more than twice.

43. The wavelength router recited in claim 39 wherein the optical arrangement and routing mechanism are relatively disposed such that each optical path is routed through the optical arrangement more than twice.

* * * * *